United States Patent [19]

Hopper

[11] Patent Number: 5,181,272
[45] Date of Patent: Jan. 19, 1993

[54] FIBER OPTIC CABLE ENTRY CONNECTOR

[75] Inventor: Scott R. Hopper, Redmond, Wash.

[73] Assignee: Augat Communications Group Inc., Seattle, Wash.

[21] Appl. No.: 758,740

[22] Filed: Sep. 12, 1991

Related U.S. Application Data

[63] Continuation-in-part of Ser. No. 541,618, Jun. 21, 1990, Pat. No. 5,074,636.

[51] Int. Cl.⁵ .............................................. G02B 6/36
[52] U.S. Cl. ..................................... 385/139; 385/76; 385/53
[58] Field of Search ...................... 385/76, 53, 77, 139

[56] References Cited

U.S. PATENT DOCUMENTS

| | | | |
|---|---|---|---|
| 4,444,461 | 4/1984 | Wey et al. | 350/96.21 |
| 4,579,418 | 4/1986 | Parchet et al. | 350/96.20 |
| 4,953,941 | 9/1990 | Takahashi | 350/96.20 |
| 4,964,685 | 10/1990 | Savitsky et al. | 350/96.2 |

Primary Examiner—John D. Lee
Assistant Examiner—Phan T. Heartney
Attorney, Agent, or Firm—Weingarten, Schurgin, Gagnebin & Hayes

[57] ABSTRACT

A fiber optic cable entry connector is described that facilitates integration of fiber optic cables with trunk housings of the type utilized in the CATV industry. The entry connector provides EMI/RFI shielding and weather sealing and is readily compatible with existing fiber optic cables. The entry connector may be reused and may be cycled open and closed to facilitate access to the cable. The entry connector includes a clamp assembly and an entry body that are configured to be mated in combination. The clamp assembly is configured to secure the cable within the connector and to provide weather sealing between the connector and the cable. The clamp assembly is configured to preposition the cores of the cable for insertion through the entry body and into the trunk enclosure. The clamp assembly may be readily adapted to accommodate any sized existing fiber optic cable. The entry body is configured to interface with the trunk housing via a threaded port thereof such as standard 5/8-24, 3/4-24, 7/8/-24 or 1-24 entry or test ports associated with the housing. Sealing members may be disposed in combination with the entry body to provide weather sealing for the connector and between the entry body and the trunk enclosure. The clamp assembly and the entry body are keyed to preclude rotation of the cable.

18 Claims, 8 Drawing Sheets

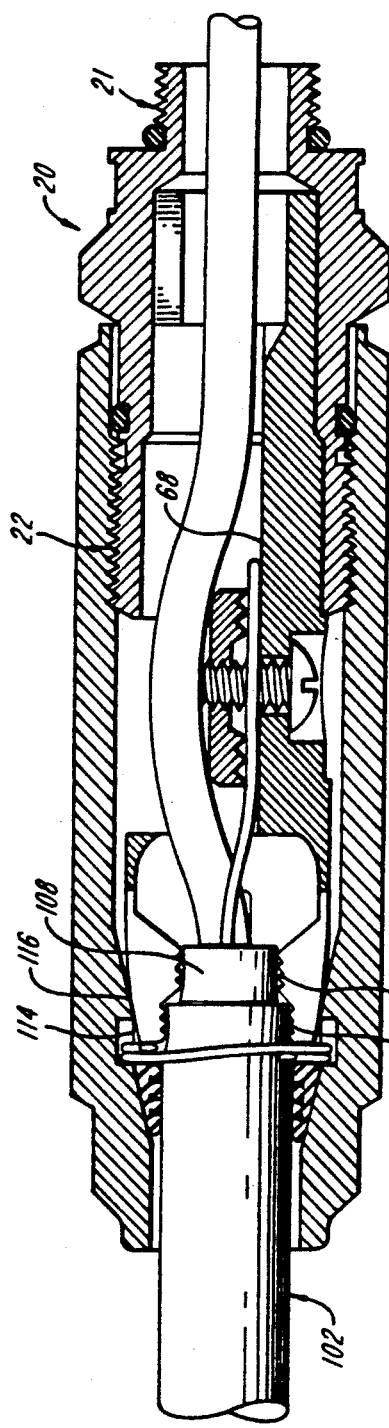
*FIG. 9B*
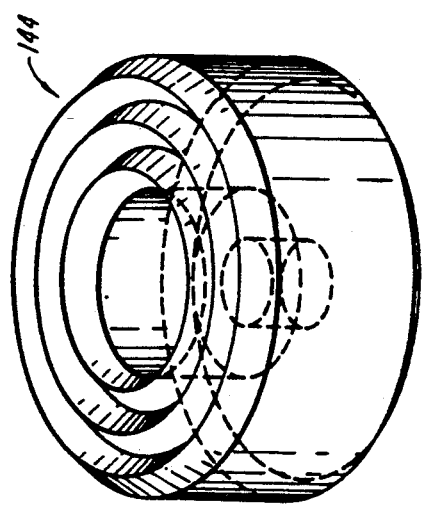
*FIG. 12A*
*FIG. 11*
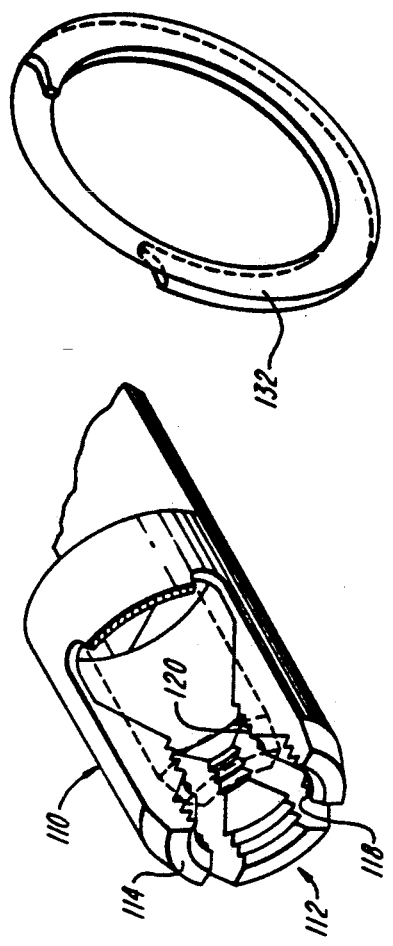
*FIG. 10*

FIBER OPTIC CABLE ENTRY CONNECTOR

CROSS REFERENCE TO RELATED APPLICATIONS

The instant invention is a continuation-in-part of allowed copending and commonly-assigned U.S. utility patent application Ser. No. 07/541,618 now U.S. Pat. No. 5,074,636 of the same inventive entity as herein.

FIELD OF THE INVENTION

The present invention relates to connectors, and more particularly to a fiber optic cable entry connector for integrating fiber optic cables into fiber optic trunk enclosures.

BACKGROUND OF THE INVENTION

Fiber optic technology is now being utilized with increased frequency in the CATV, telecommunications and other industries. One aspect of this increased utilization requires that fiber optic cable be integrated into EMI/RFI shielded and weather sealed aerial, buried and underground enclosures/trunk housings or other sealed enclosures. The housings contain fiber optic connectors or splices of types known in the art, such as described in U.S. Pat. No. 4,444,461, which are utilized to precisely space and align the clad cores of the fiber optic cables.

Current methods for integrating fiber optic cables into shielded/sealed trunk housings are varied and often result in compromise of the integrity of the EMI/RFI shielding and/or weather sealing. For example, one method of integration involves drilling a hole into one side of the trunk enclosure. The hole is lined with a rubber grommet and the fiber optic cable fed through the grommeted hole until positioned so that the central strength member can be secured to a fastener within the housing. After the cable is securely positioned and aligned, silicon grease is applied to the grommet/cable entry area to enhance the weather seal.

The method for integrating fiber optic cables into a trunk housing as described in the preceding paragraph does not provide EMI/RFI shielding. Furthermore, the cable is only secured by friction forces exerted by the grommet such that the cable may be inadvertently subject to rotation which may adversely affect core spacing/alignment. In addition, such movement of the cable may degrade the weather seal such that sufficient protection against environmental conditions is not provided, thereby allowing contaminating matter to enter the trunk housing.

A need exists for a fiber optic cable entry connector which facilitates integration of fiber optic cables with sealed housings. The connector should provide both EMI/RFI shielding, strain relief and proper weather sealing to preclude conditions which may adversely affect data transmission within cable cores. The connector should be readily compatible with the various constructions and sizes of fiber optic cables available in the market today. The connector should be configured to preclude inadvertent rotation of the cable. The connector should facilitate preparation of the cable prior to integration with the trunk housing.

SUMMARY OF THE INVENTION

A fiber optic cable entry (OCE) connector is provided that facilitates integration of fiber optic cables with trunk enclosures. The OC connector provides EMI/RFI shielding and proper weather sealing to preclude conditions which may adversely affect data transmission between cable cores and/or degrade the operation of associated electronic components within the trunk enclosure. The OCE connector is readily compatible with the various constructions and sizes of fiber optic cables available in the market toady. The OCE connector is configured to preclude inadvertent rotation of the cable. The OCE connector facilitates preparation of the cable prior to integration with the trunk housing. The OCE connector is configured so that both the outer jacket and the central strength member of the fiber optic cable are secured thereto. The configuration of the OCE connector allows the connector to be re-used, and in addition, allows the connector to be cycled open or closed. The OCE connector is configured for integration with a threaded port of the trunk enclosure such as standard ⅝-24, ¾-24, ⅞-24 or 1-24 entry or test ports associated with trunk enclosures. Although it has utility for any RFI/EMI shielded and environmentally-sealed housing, the present invention discloses as an exemplary embodiment a fiber optic entry connector for CATV.

The OCE connector according to the present invention includes a clamp assembly for mounting and generally aligning a fiber optic cable within the connector and an entry body for interfacing the connector with a threaded port of the trunk housing such as standard ⅝-24, ¾-24, ⅞-24 or 1-24 entry or test ports associated with trunk housings. In one embodiment, the clamp assembly includes a clamp nut, an internal collet, an internal sealing subassembly, and a clamp body, and in another embodiment, the clamp assembly includes a clamp nut, an internal sealing subassembly and a clamp body having integral fiber optic gripping fingers. The clamp assembly and the entry body provide EMI/RFI shielding for the connector and preclude the entry of interference radiation into the trunk housing. The internal sealing subassembly and sealing members disposed in combination with the entry body provide weather sealing for the connector, between the connector and the cable, and between the connector and the trunk housing.

The clamp nut is configured to mate with the entry body and to be disposed about the cable. The internal configuration of the clamp nut provides for internal mounting of the collet, the sealing subassembly and the clamp body in the one embodiment, and in the other embodiment, provides for internal mounting of the sealing subassembly and the clamp body. The external configuration of the clamp body facilitates mating engagement with the entry body. In the one embodiment, the collet is configured for internal mounting within the clamp nut. The internal configuration of the collet provides press-fit engagement with the jacket of the fiber optic cable, thereby facilitating securement of the fiber optic cable within the OCE connector. The internal configuration of the collet may be readily reconfigured to accommodate fiber optic cables of varied outside diameters and internal construction. In the other embodiment, the gripping fingers of the clamp body clamp both the jacket of the cable and its EMI/RFI shield.

The sealing subassembly is configured for internal mounting within the clamp nut. The sealing subassembly interacts with the clamp nut, the collet and the fiber optic cable in the one embodiment and interacts with the clamp nut and the fiber optic cable in the other embodiment to provide weather sealing between the clamp assembly and the fiber optic cable.

The clamp body is configured to be mounted within the clamp nut and to permit the clamp nut to be rotated relative to the clamp body. The clamp body includes a cylindrical portion internally configured to act as a stop for the fiber optic cable and which may be readily reconfigured to accommodate fiber optic cable of varied outside diameters and construction. The clamp body includes a means for securing the central strength member of the fiber optic cable to the clamp body, thereby facilitating securement of the cable within the OCE connector. The clamp body also includes an interfacing portion configuration that is "keyed" to corresponding structure of the mating body such that mating between the clamp body and the entry body is controlled and relative rotation between the fiber optic cable and the OCE connector is precluded. The interfacing portion is also configured to preposition the fiber optic conductors of the cable for insertion into the entry member.

The entry body is configured to be mated in combination with the clamp assembly and to interface with a threaded port of the trunk enclosure. The entry body includes a first threaded portion that is configured for threaded engagement with the threaded port which may be a standard ⅝-24, ¾-24, ⅞-24 or 1-24 entry or test ports associated with trunk enclosures. The entry body further includes a second threaded portion configured for threaded engagement with the clamp nut. The internal configuration of the second threaded member is "keyed" to the interfacing portion of the clamp body to preclude relative rotation between the clamp body and the entry body. Sealing members disposed in combination with the entry body interact with the trunk housing and the clamp nut, respectively, to provide weather sealing between the entry body and trunk enclosure and between the clamp assembly and the entry body.

BRIEF DESCRIPTION OF THE DRAWINGS

A more complete understanding of the present invention and the attendant advantages and features thereof will be more readily understood by reference to the following detailed description when considered in conjunction with the accompanying drawings wherein:

FIG. 10 is a fragmentary perspective view of fiber optic gripping fingers of the clamp body of the shielded, environmentally-secure optic connector of FIG. 9;

FIG. 11 is a perspective view of an annular bushing of the sealing member of the shielded, environmentally-secure fiber optic connector of FIG. 9.

DETAILED DESCRIPTION OF THE PREFERRED EMBODIMENTS

Figure 1:
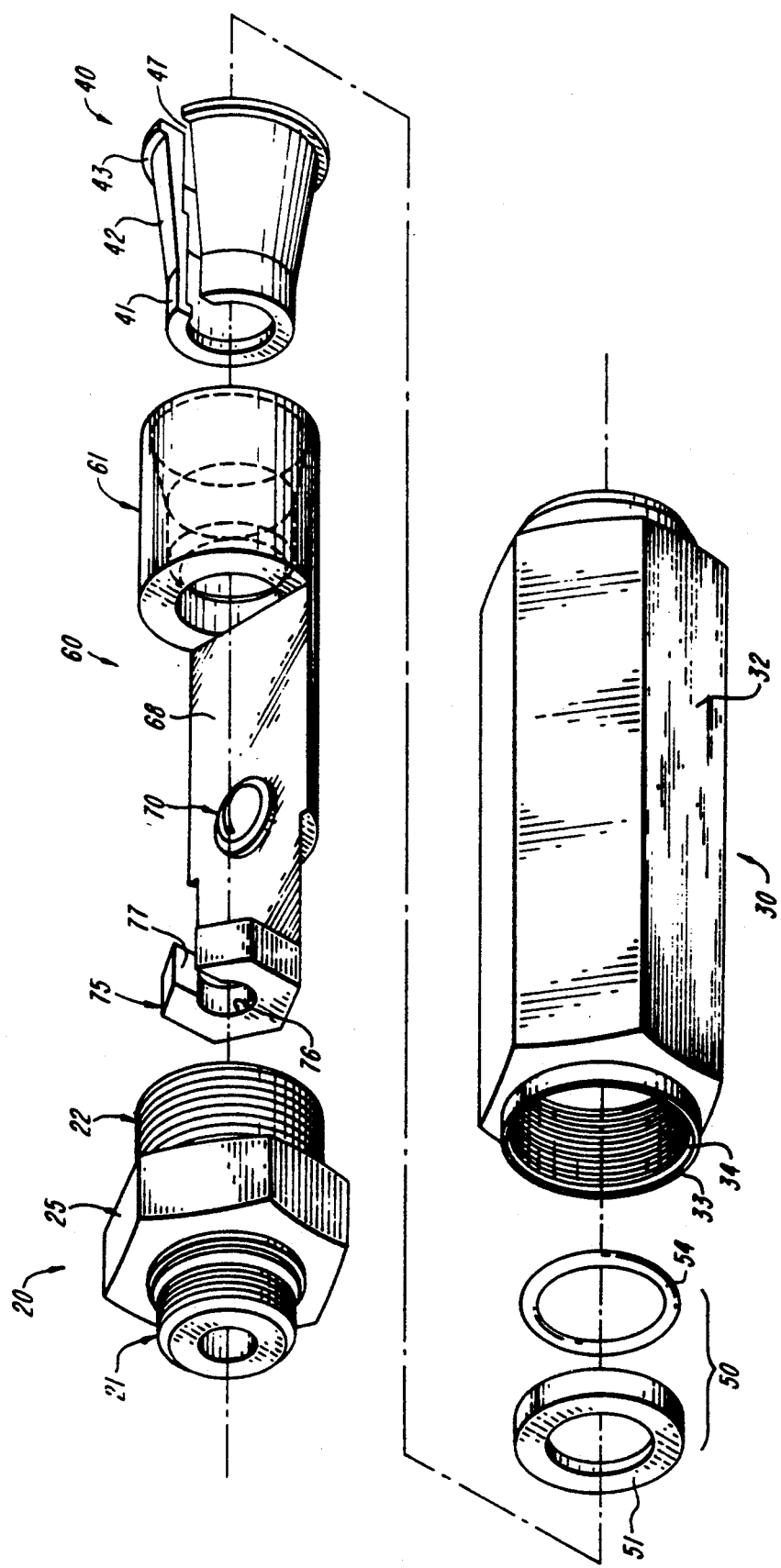
FIG. 1 is an exploded perspective view of an embodiment of a fiber optic cable entry connector according to the present invention.
Figure 2:
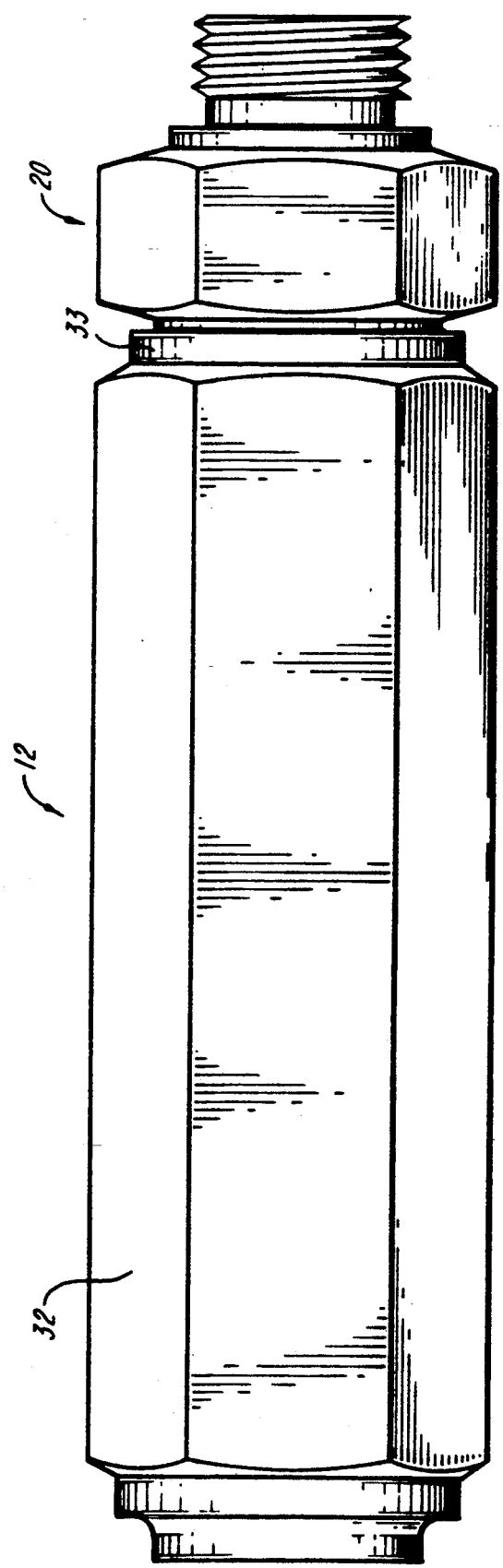
FIG. 2 is a plan view of the assembled connector of FIG. 1.
Figure 3:
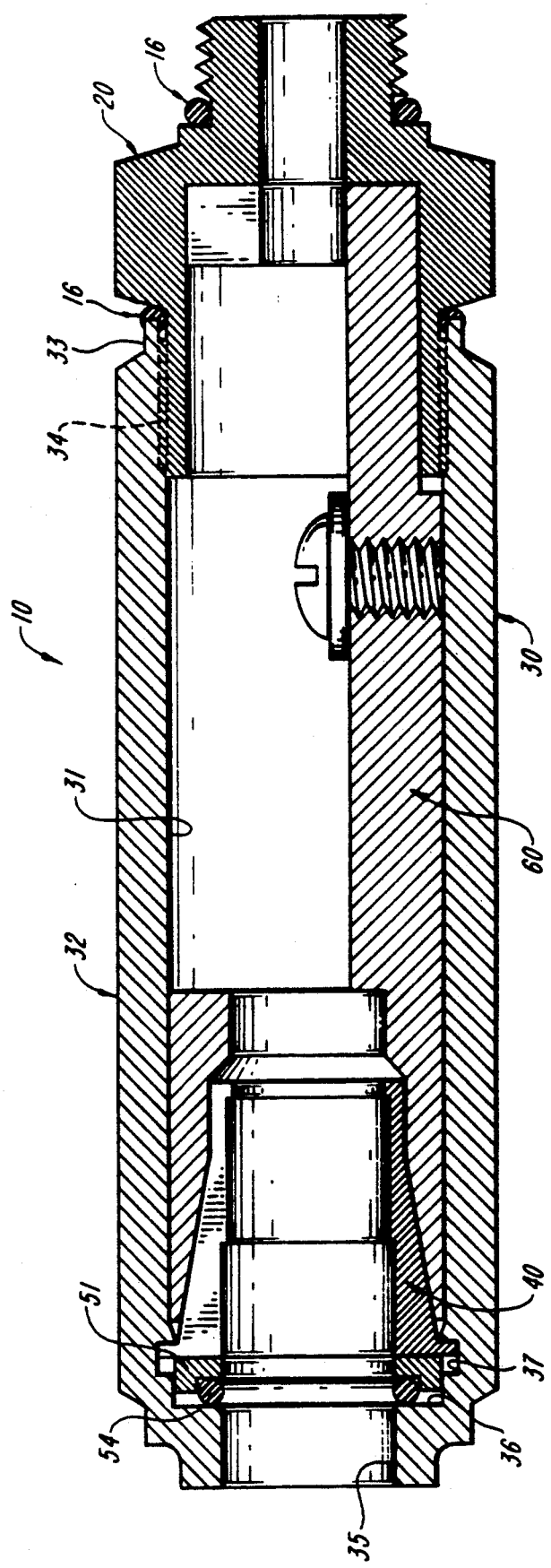
FIG. 3 is a cross-sectional view of the connector of FIG. 2.
Figure 8:
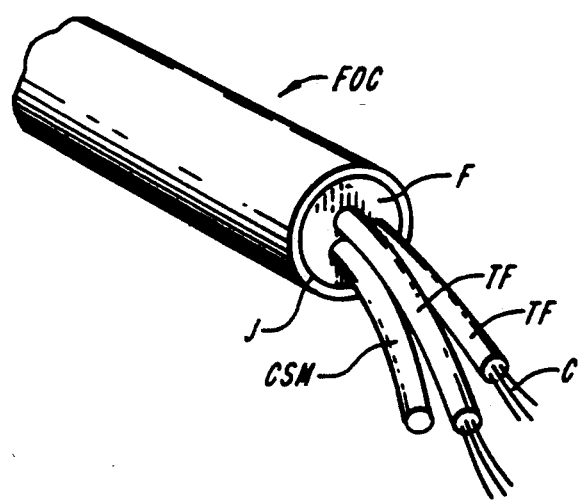
FIG. 8 is a sectioned perspective view of a typical fiber optical coaxial cable.

Referring now to the drawings wherein like reference numerals designate corresponding or similar elements throughout the several views, an embodiment of a fiber optic cable entry (OCE) connector 10 is exemplarily illustrated in FIGS. 1, 2, and 3. The configuration of the OCE connector 10 facilitates quick preparation of a fiber optic cable for integration with a fiber optic trunk housing or other sealed housing (not shown) and provides EMI/RFI shielding, strain relief and weather sealing. To facilitate a better understanding of the following disclosure, reference is made to FIG. 8 which shows one typical embodiment of a fiber optic cable FOC known to those skilled in the art. The fiber optic cable shown includes a jacket (J), first and second tubed fibers TF having clad cores C therein for transmitting light radiation, a central strength member CSM, an extra strength member ESM and filler F.

The OCE connector 10 according to the present invention includes a clamp assembly 12 configured for securing and generally aligning a fiber optic cable in combination with the connector and an entry body 20 configured for interfacing with a threaded port (not shown) of the trunk housing. The clamp assembly 12 includes a clamp nut 30, an internal collet 40, an internal sealing subassembly 50, and a clamp body 60. The structural elements of the OCE connector lo, with the exception of the sealing elements, may be formed from a mechanically rigid material such as aluminum or high strength plastic.

The clamp nut 30, illustrated in greater detail in FIG. 1 and FIG. 3 has an extended configuration and an internal circular bore 31 dimensioned to receive the entry body 20, the collet 40, the internal sealing subassembly 50 and the clamp body 60, respectively, as described in greater detail hereinbelow. The external surface 32 of the clamp nut 30 has a hexagonal configuration to facilitate mating of the clamp nut 30 with the entry body 20. A first end of the clamp nut 30 includes an integral annular flange 33 and internal threads 34. The other end of the clamp nut 30 includes an entry bore 35, an internal annular stepped shoulder 36, and an internal annular well 37. The entry bore 35 is dimensioned to receive the fiber optic cable. The internal well 37 is configured to receive and retain the collet 40 internally within the clamp nut 30. The stepped shoulder 36 is configured for mounting the internal sealing subassembly 50 within the clamp nut 30.

Figure 4:
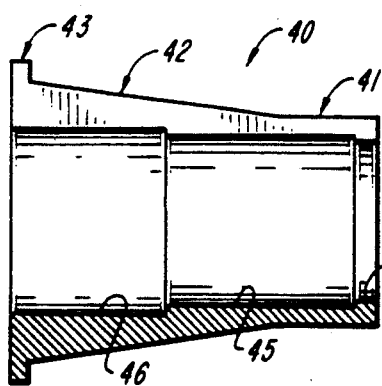
FIG. 4 is a cross-sectional view of a collet for the connector of FIG. 1.

The collet 40 is shown in FIG. 4 and has a first end 41 having a cylindrical configuration, an intermediate tapering portion 42 and an annular flange 43 at the second end thereof. The annular flange 43 is dimensioned to abuttingly engage the forward wall of the internal annular well 37 of the clamp nut 30 such that the collet 40 is retained therein. The first end of the collet 40 has a reduced aperture 44 that is dimensioned to press fit engage the jacket of the fiber optic cable. The internal configuration of the collet 40 includes a first circular bore 45 and a second circular bore 46. The body of the collar 40 is split lengthwise, as illustrated by reference numeral 47 in FIG. 1, to facilitate mounting of the collet 40 within the clamp nut 30.

The first circular bore 45 may be dimensioned to accommodate fiber optic cables of varied outer diameters. Fiber optic cables available in the market today may have outer diameters of 0.312, 0.360, 0.400, 0.420, 0.430, 0.440, 0.460, 0.470, 0.480, 0.490, 0.510, 0.520, 0.560 or 0.600 inches. The collet 40 allows the OCE connector 10 according to the present invention to be readily modified to accommodate fiber optic cables of differing outer diameters.

Figure 5:
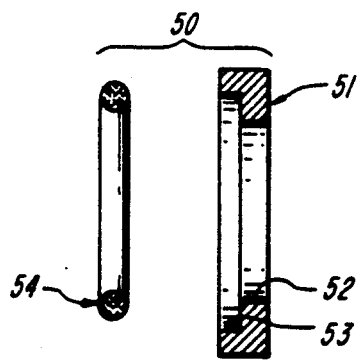
FIG. 5 is a cross-sectional view of an internal sealing means subassembly for the connector of FIG. 1.
Figure 6A:
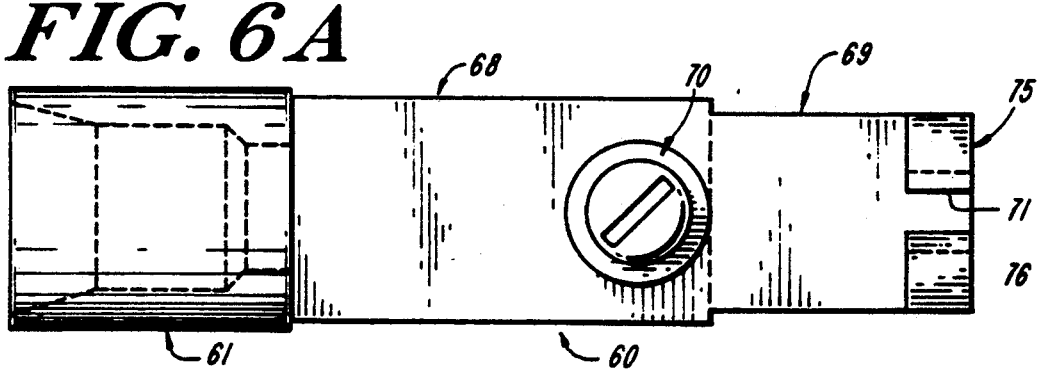
FIG. 6A is a plan view of a clamp body for the connector of FIG. 1.
Figure 6B:
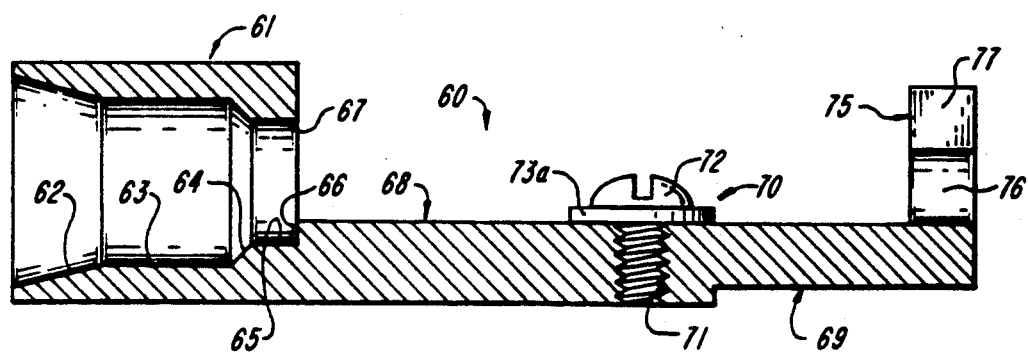
FIG. 6B is a cross-sectional view of the clamp body of FIG. 6A.

The internal sealing assembly 50 is illustrated in FIG. 5 and includes an annular carrier 51 and an O-ring 54. The carrier 51 has a first bore 52 and a second bore 53 dimensioned for mounting the O-ring 54. As shown in FIG. 3 the internal sealing assembly 50 is dimensioned to loosely nest within the internal stepped shoulder 36 of the clamp nut 30. One face of the annular carrier 51 abuts against the face of the annular flange 43 of the collet 40 and the O-ring 54 abuts against the internal shoulder 36 such that the other face of the annular carrier 51 is spaced apart from the internal shoulder 36. The clamp body 60 is depicted in FIGS. 6A and 6B and for the embodiment illustrated has an overall length of about 3.5 inches. The clamp body 60 has a configuration so that it may be nested internally within the clamp nut 30 in combination with the collet 40 and such that a portion thereof extends outwardly of the integral annular flange 33. The clamp body 60 includes a first end 61 of cylindrical configuration. The cylindrical portion 61 has an internal configuration that includes a first tapered bore 62, a first circular bore 63, a second tapered bore 64 and a second circular bore 65. The second tapered bore 65 may act as a stop for the fiber optic cable. The second circular bore 65 is dimensioned to accommodate fiber optic cables of varied outer diameters as discussed hereinabove with respect to the first circular bore 45 of the collet 40.

The clamp body 60 further includes an intermediate, solid semicylindrical member 68 and an interfacing portion 69. The arcuate portion of the semicylindrical member 68 is configured so that the clamp body 60 is slidably receivable within the internal bore of the clamp nut 30 and allows the clamp nut 30 to be rotated relative to the clamp body 60. The first tapered bore 62 and the first circular bore 63 of the cylindrical portion 61 are dimensioned to engage the outer surfaces of the tapered portion 42 and the cylindrical portion 41, respectively, of the collet 40.

An end face portion 66 of the semicylindrical member 68 partially blocks the second circular bore 65 such that the opening 67 of the cylindrical portion 61 onto the semicylindrical member 68 is less than fully circular. The end face portion 66 may function as a stop for the fiber optic cable.

A means 70 for securing the central strength member CSM of the fiber optic cable to the clamp body 60 is disposed in combination with the semicylindrical member 68. For the embodiment illustrated in FIGS. 6A and 6B, the means 70 comprises a threaded bore 71 extending through the semicylindrical member 68, a complementary screw 72, and a bellevue washer 73a. The central strength member CSM of the fiber optic cable is disposed on the planar surface of the semicylindrical member 68 and secured thereto by threading the washer 73a to physically engage the strength member CSM.

Figure 6C:
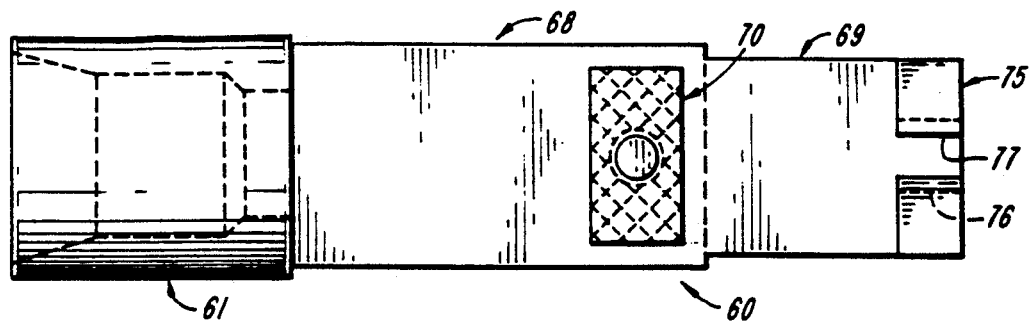
FIG. 6C is a plan view of the clamp body illustrating an alternate embodiment of the cable securing means.
Figure 6D:
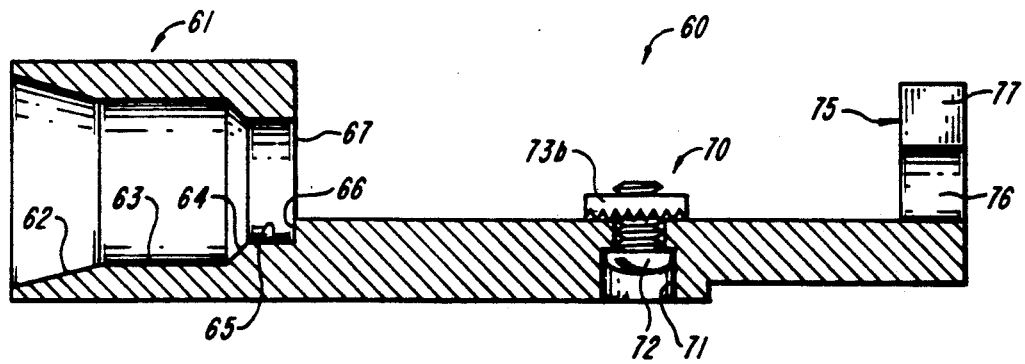
FIG. 6D is a cross-sectional view of the clamp body of FIG. 6C.

An alternative embodiment of the cable securing means 70 is illustrated in FIGS. 6C and 6D and includes a stepped bore 71, the smaller portion of which is threaded, extending through the semicylindrical member 68, a complementary screw 72 which is countersunk in the semicylindrical member 68, and an engaging clamp 73b. The central strength member CSM of the fiber optic cable is disposed on the planar surface of the semicylindrical member 68 and secured thereto by threading the clamp 73b to physically engage the strength member CSM.

As illustrated in FIGS. 6C and 6D, the engagement clamp 73b has a rough surface to facilitate engagement of the central strength member CSM. The engaging face of the clamp 73b may be smooth, and the clamp 73b may have shapes other than the illustrated rectangular shape. While the cable securing means 70 has been described in the preceding paragraphs as engaging only the central strength member CSM of the fiber optic cable, it will be appreciated that the extra strength member ESM of the fiber optic cable could also be secured in a similar manner.

The interfacing portion 69 is configured to be mated with the entry body 20 and includes an extended portion 74 integral with the semicylindrical member 68 and an interlocking portion 75 configured for interlocking engagement with complementary structure of the entry body 20. With the interfacing portion 69 mated in combination with the entry body 20, the interlocking portion 75 locks the clamp body 60 in combination with the entry body 20 and precludes rotation of the clamp body 60 during mating of the clamp nut 30 with the entry body 20.

As illustrated in FIGS. 6A, 6B, 6C and 6D, the extended portion 74 has a solid triangular configuration and the interlocking portion 75 has a slotted hexagonal configuration. Two faces of the slotted hexagonal portion 75 are integral with corresponding faces of the triangular portion 74. The slotted hexagonal portion 75 includes a circular bore 76 and a slot 77 opening into the circular bore 76 for prepositioning the clad cores C of the cable for insertion into the entry body 20. The interlocking portion 75 may have other configurations which facilitate locking between the clamp body 60 and the entry body 20. For example, the interlocking portion 75 may have other non-cylindrical configurations or may include one or more pins configured for insertion in complementary apertures of the entry body 20, thereby locking the clamping body 60 in combination with the entry body 20.

Figure 7A:
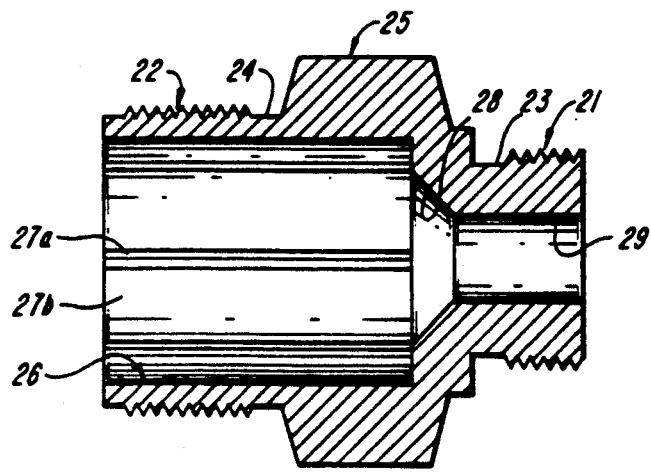
FIG. 7A is a cross-sectional view of an entry body for the connector of FIG. 1.
Figure 7B:
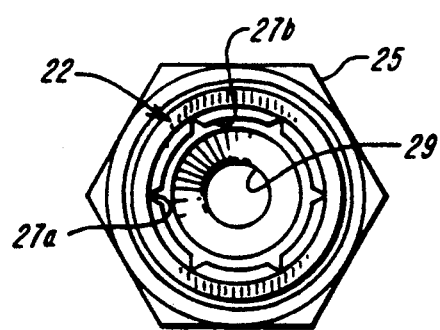
FIG. 7B is an end plan view of the entry body of FIG. 7B.

The entry body 20 is illustrated in FIGS. 7A and 7B and is configured to be disposed in combination with the clamp assembly 12 and to interface with a threaded entry port (not shown) of the trunk housing. Preferably the entry body 20 is configured to interface with standard ⅝-24, ¾-24, ⅞-24 or 1-24 entry or test ports associated with trunk housings. The entry body 20 is further configured to provide, in combination with the clamp body 60, a "keyed" structure that precludes inadvertent rotation of the fiber optic cable that is secured within the OCE connector 10.

The entry body 20 includes a first threaded member 21 configured for threaded engagement with a threaded entry port of the trunk housing and a second threaded member 22 configured for threaded engagement with the internal threads 34 of the clamp nut 30. Wells 23, 24 are formed adjacent the first and second threaded members 21, 22, respectively, for O-rings 16. The entry body 20 also includes an intermediate hexagonal portion 25 to facilitate threaded engagement of the entry body 20 with the threaded entry port.

The entry body 20 includes an internal bore configuration 26 that is "keyed" to the external configuration of the interlocking portion 75 of the clamp body 60, a tapered annular bore 28, and a cylindrical bore 29. The cylindrical bore 29 is dimensioned to accommodate the conductors of the fiber optic cable that is secured in combination with the clamp subassembly 12.

As shown in greater detail in FIG. 7B, the internal bore configuration 26 includes a plurality of V-shaped extended notches 27a equidistantly spaced about the circumference of the bore, and slightly arcuate extended surfaces 27b intermediate adjacent notches 27a. The "keyed" relationship between the slotted hexagonal portion 75 and the internal bore configuration 26 permits the clamp body 60 to be inserted into the entry body 20 only in 60° increments. Once inserted, interaction between the "keyed" elements, i.e., the slotted hexagonal portion 75 of the clamp body 60 and the internal bore configuration 26 of the entry body 20, precludes relative rotation between the clamp body 60 and the entry body 20.

To utilize the OCE connector, the clamp nut 30, with the internal sealing means 50 and the collet 40 seated internally therein, is slid onto the jacket of the fiber optic cable. A length of the jacket is removed to expose the loose-tube or tight-tube fibers. The clamp body 60 is slid onto the cable until the cable jacket abuts the second tapered bore 64 or the stop 66. The central strength member CSM is then secured to the clamp body 60 by means of the cable securing means 70. The excess strength member ESM of the cable is removed and the fiber(s) are inserted through the slot 77 into the circular bore 76.

The entry body 20 is then mated in combination with the entry port of the trunk housing by threading the first threaded end 21 into the entry port. The O-ring 16 in the well 23 is compressed intermediate the well wall and the port of the trunk housing to provide a weather seal between the entry body 20 and the trunk housing. The fiber(s) are inserted into the entry body 20 and through the cylindrical bore 29 and the slotted hexagonal portion 75 of the clamp body 60 is mated with the internal bore configuration 26 of the entry body 20. The clamp nut 30 is then slid forward onto the clamp body 60 and the internal threads 34 are threaded into engagement with the second threaded member 22 of the entry body 20. The O-ring 16 in the well 24 is compressed intermediate the annular flange 33 and the hexagonal portion 25 to provide a weather seal between the entry body 20 and the clamp assembly 12.

The internal collet 40 mechanically engages the cable jacket to retain the fiber optic cable in combination with the OCE connector 10. The O-ring 54 of the internal sealing assembly 50 interacts with the cable jacket, the annular carrier 51 and the wall of the clamp nut 30 to provide a weather seal between the OCE connector 10 and the fiber optic cable. The entry body 20 and the clamp nut 30 provide EMI/RFI shielding.

A variety of modifications and variations of the present invention are possible in light of the above teachings. For example, the cable securing means may be modified to provide an enhanced gripping surface for engaging the cable strength member(s) and to provide a more uniform clamping force. The cable securing means may be relocated to the bottom portion of the clamp body to facilitate cable termination, to reduce the profile of the cable securing means and to allow a reduction in the overall length of the connector. Relocating the cable securing means may also reduce the congestion on the upper surface of the clamp body, thereby allowing a reduction in the overall length of the clamp body.

Figure 9A:
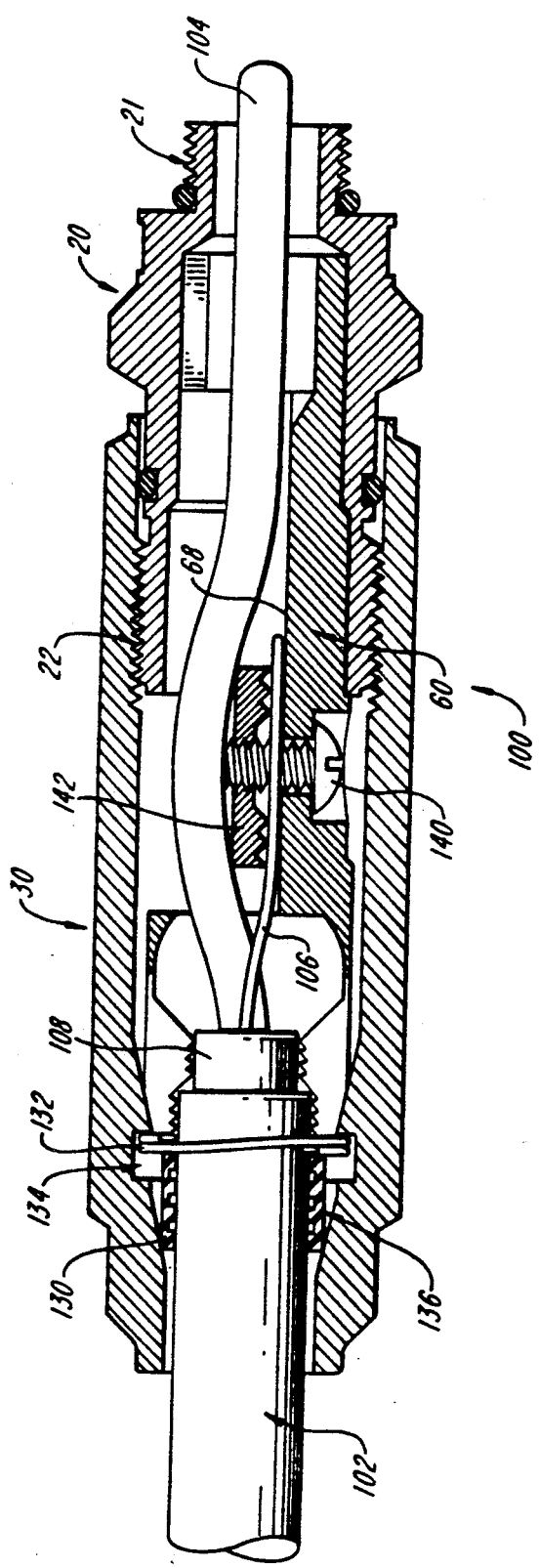
FIG. 9 illustrates in FIG. 9A and 9B longitudinal sections of a further embodiment of a shielded, environmentally-secure fiber optic connector in accord with the present invention.

Referring now to FIG. 9, generally designated at 100 is another embodiment of a shielded, environmentally-secure fiber optic connector in accord with the present invention. The connector 100 includes the clamp nut 30 and cooperative entry body 20 and clamp body 60 that receive optic fiber cable generally designated 102 in such a way as to enable the optic fibers thereof, schematically illustrated as bundle 104, to be received in an environmentally-secure way to a trunk housing, not illustrated, with longitudinally-extending armor members 106 thereof securely terminated to clamp body 60 and with circumferentially and longitudinally extending metallic shield member 108 thereof electrically grounded to clamp body 60. The embodiment 100 differs from the embodiments heretofore described in connection with the description of the FIGS. 1-8 in three principal respects. In the first place, the clamp body 60 is provided on its fiber optic cable receiving end with opposing sets of radially-collapsible, cantilevered fingers generally designated 110, 112 as best seen in FIG. 10. The opposing sets of cantilevered fingers 110, 112, have beveled surfaces 114 on the outside surface of their free ends that cooperate with an annular bevel 116 borne by the confronting inside surface of the clamp nut 30 such that as the clamp nut 30 is threaded onto the entry body 20 the fingers 110, 112 collapse radially inwardly. Longitudinally and radially spaced serrations 118, 120 are formed respectively on confronting inside surfaces of each of the cantilevered fingers of the opposed sets of cantilevered fingers 110, 112 that releasably grip the jacket of the optic fibers between the serrations 118 and simultaneously releasably grip the shield 108 thereof between the serrations 120 as the cantilevered fingers radially collapse inwardly by action of threading the clamp nut 30 to the entry body 20. The fiber optic cable 102 thereby is secured mechanically to the entry body 20 via the clamp nut 30, and the shield 108 thereof is simultaneously electrically connected securely to electrical ground.

The embodiment 100 differs in the second place in the manner by which the connector embodiment 100 is able to environmentally seal the fiber optics of the cable bundle 104 over a range of varying diameters of the jackets thereof. A rubber bushing 130 having an outside diameter corresponding to but slightly greater than the inside diameter of the free end of the clamp nut 30 is slidably received therewithin, and a radially-collapsible and expandable bushing 132, best seen in FIG. 11, is slidably inserted in collapsed condition in the internal bore of the clamp nut 30 and pushed into a groove generally designated 134 provided therefor on the inside surface of the clamp nut 30 wherein it assumes its expanded condition, as illustrated, such that it bears against the confronting end of the rubber bushing 130 retaining the same within the bore of the clamp nut 30. The axial length of the groove 134 is selected to be a multiple of the axial length of the bushing 132 to enable the bushing 132 to axially move therewithin in a manner to be described. A plurality of longitudinally spaced annular grooves are provided on the inside of the rubber bushing 130 to permit it to buckle into itself so as to assume sealing relation with the outside surface of the fiber optic cable 102 and the inside surface of the clamp nut 30 in a manner to be described. The inside diameter of the rubber bushing 130 is selected to be just slightly larger than the outside diameter of the fiber optic cable 102. By selection of a rubber bushing 130 that has an inside diameter that corresponds to the outside diameter of a particular diameter fiber optic cable, optic fiber bundles of different outside diameters may all be received within and environmentally sealed to the bore of the nut 30.

In operation of the bushing 130, as the clamp nut 30 is threaded to the entry body 20, the clamp nut 30 is moved axially towards the entry body 20 as it is rotated about the teeth 22 thereof. As it moves, the free ends of the opposed sets of cantilevered fingers 110, 112 bear against the confronting surface of the bearing 132 allowing their relative rotation. As the clamp nut 30 is moved longitudinally toward the entry body 20, the bearing 132 is pushed against the rubber bushing 130. The rubber bushing 130, constrained against outward expansion by the inside surface of the clamp nut 30, radially collapses and folds into its plural annular grooves 136 such that its outer surface is brought into sealing relation with the confronting surface of the clamp nut 30 and its inside surface is brought into sealing relation with the confronting surface of the particular fiber optic cable 102 as best seen in FIG. 9B. The process is reversed as the assembly is disconnected.

Figure 12B:
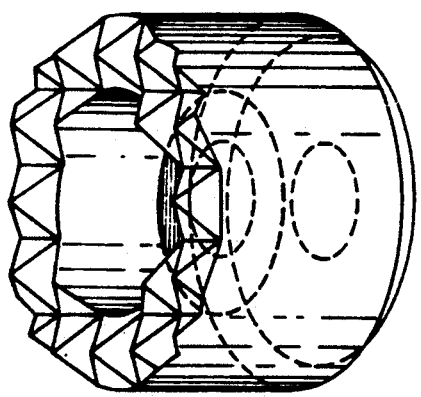
FIG. 12 illustrates in the FIGS. 12A, 12B thereof perspective views of alternative of fiber optic strength member securing nuts of the shielded, environmentally-secure fiber optic connector of FIG. 9.

The strength member 106, typically a steel, Kevlar, or Kevlar composite cable, is wrapped about or placed beneath a threaded fastener 140 slidably received transversely through the clamp body 60, and is captured by the confronting surface of a cooperative nut 142. As seen in FIG. 12A, the confronting surface of the nut 142 may be provided with a plurality of concentric, sharped annular ridges generally designated 144, and, as seen in FIG. 12B, it may be provided with a plurality of spaced-apart points 146 in a "knurled" configuration. The threaded fastener and nut in either embodiment provide a clamp that enables to securely retain the strength member 106, whether it is metallic, epoxy Kevlar, or unbonded Kevlar fibers. Kevlar is a trademark of the Dupont Company.

Many modifications of the presently disclosed invention will become apparent to those skilled in the art having benefitted from the instant disclosure.

What is claimed is:

1. A fiber optic cable entry connector for integrating a fiber optic cable having an external jacket and strengthening member to a housing, comprising:
   a housing having first and second matable members each defining when mated together an enclosed channel for allowing optic fibers to be passed from the external jacket to the trunk housing;
   said first housing member having means for engagement to the trunk housing, an opening for allowing optic fibers to be channeled to the trunk housing, and means for releasably mating with said second housing member;
   said second housing member having means for releasably mating with said first housing member and an opening for receiving the jacketed cable; and
   a clamp assembly enclosed at least partially within said defined channel and having ends, means disposed intermediate said ends for securing the cable strengthening member, and means disposed on one of said ends and cooperative with said second housing member for clamping the jacketed cable within said channel and at a location near said second housing member opening.

2. The invention of claim 1, wherein said fiber optic cable also has a conductive shield, and wherein said clamping means includes means cooperative with said second housing member for clamping said conductive shield to electrical ground.

3. The invention of claims 1 or 2, further including means disposed on the other of said ends and cooperative with said first housing member for locking the same against rotation with respect to said first housing member.

4. The invention of claims 1 or 2 further including means disposed on the other of said ends for aligning optic fibers with said first housing member opening.

5. The invention of claims 1 or 2, further including means for weather proofing between said second housing member and the fiber optic cable.

6. The invention of claim 5, wherein said weather proofing means includes a radially collapsible rubber bushing.

7. The invention of claim 6, wherein said rubber bushing is provided with at least one annular groove on its inside surface into which it folds as it is radially collapsed.

8. The invention of claim 6, wherein said weather proofing means further includes a bearing that is moved axially by said one of said ends of said clamp assembly as the first and second housing members are releasably mated, which said one of said ends axially pushes the bearing against the rubber bushing causing it to radially collapse into sealing relation between said second housing member and said fiber optic cable.

9. The invention of claim 8, wherein said second housing portion includes an annular groove in which the bearing is located.

10. The invention of claim 9, wherein the bearing is radially collapsible and expansible.

11. The invention of claim 10, wherein said radially collapsible and expansible bearing is configured as a ring spring.

12. The invention of claim 2, wherein said clamping means includes opposing sets of cantilevered fingers having inside surfaces, and longitudinally and radially spaced serrations formed on the inside surfaces of the opposing sets of cantilevered fingers respectively to releasably grip the jacket of the optic fiber between some of the longitudinally and radially spaced serrations and simultaneously releasably grip the shield between the others of the longitudinally and radially spaced serrations.

13. The invention of claims 1 or 2, wherein said securing means includes a nut having a surface constituted by at least one sharpened annular ridge.

14. The invention of claims 1 or 2, wherein said securing means includes a nut having a plurality of sharped points in a "knurled" configuration.

15. The invention of claims 1 or 2, wherein said means for clamping includes opposing sets of cantilevered fingers.

16. The invention of claim 15, wherein said opposing sets of cantilevered fingers have free ends and have beveled surfaces on outside portions of their free ends, and wherein said second housing member has an annular bevel formed on an inside surface thereof confronting the beveled surfaces on the free ends of the opposing sets of cantilevered fingers that cooperate therewith to cause the opposing sets of cantilevered fingers to collapse radially inwardly as the first and second housing members are releasably mated.

17. The invention of claim 16, wherein the opposing sets of cantilevered fingers have inside surfaces, and wherein serrations are provided on the inside surfaces of the opposing sets of cantilevered fingers to provide a frictional gripping capability.

18. The invention of claim 1, wherein said clamping means includes opposing sets of cantilevered fingers having internal surfaces, and friction providing contours borne by the inside surfaces of the opposing sets of cantilevered fingers.

* * * * *

UNITED STATES PATENT AND TRADEMARK OFFICE
CERTIFICATE OF CORRECTION

PATENT NO. : 5,181,272
DATED : January 19, 1993
INVENTOR(S) : Scott R. Hopper

It is certified that error appears in the above-indentified patent and that said Letters Patent is hereby corrected as shown below:

Column 1, line 68, "OC connector" should read
--OCE connector--.

Column 4, line 45, "connector lo" should read
--connector 10--.

Signed and Sealed this

Twenty-fourth Day of May, 1994

Attest:

BRUCE LEHMAN

Attesting Officer

Commissioner of Patents and Trademarks